US012322107B2

(12) United States Patent
Allier et al.

(10) Patent No.: US 12,322,107 B2
(45) Date of Patent: Jun. 3, 2025

(54) METHOD FOR DETECTING A CELL EVENT

(71) Applicant: COMMISSARIAT A L'ENERGIE ATOMIQUE ET AUX ENERGIES ALTERNATIVES, Paris (FR)

(72) Inventors: Cédric Allier, Grenoble (FR); Dorothée Krämer, Grenoble (FR); Lionel Herve, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 464 days.

(21) Appl. No.: 17/453,678

(22) Filed: Nov. 5, 2021

(65) Prior Publication Data
US 2022/0189026 A1 Jun. 16, 2022

(30) Foreign Application Priority Data
Nov. 6, 2020 (FR) ..................... 20 11442

(51) Int. Cl.
G06T 7/00 (2017.01)
G06V 10/22 (2022.01)
(52) U.S. Cl.
CPC .......... *G06T 7/0016* (2013.01); *G06V 10/22* (2022.01); *G06T 2207/10148* (2013.01);
(Continued)
(58) Field of Classification Search
CPC ......... G06T 7/0016; G06T 2207/10148; G06T 2207/20081; G06T 2207/20084;
(Continued)

(56) References Cited

U.S. PATENT DOCUMENTS

2009/0086314 A1* 4/2009 Namba ............... G02B 21/34
359/383
2010/0136549 A1* 6/2010 Christiansen ......... G06T 7/44
382/128
(Continued)

FOREIGN PATENT DOCUMENTS

WO WO 2018/187548 A2 10/2018

OTHER PUBLICATIONS

French Preliminary Search Report issued Jul. 6, 2021 in French Application 20 11442 filed on Nov. 6, 2020, 16 pages (with English Translation of Categories of Cited Documents & Written Opinion).

*Primary Examiner* — Nancy Bitar
(74) *Attorney, Agent, or Firm* — Oblon, McClelland, Maier & Neustadt, L.L.P.

(57) ABSTRACT

Method for detecting or predicting the occurrence of a cell event, selected from between cell division or cell death, in a sample (10), the sample extending in at least one sample plane ($P_{10}$) and comprising cells ($10_p$) immersed in a medium, the method comprising the following steps:

a) arranging the sample between a light source (11) and an image sensor (16);
b) illuminating the sample (10) using the light source (11) and acquiring a plurality of successive images (($I_1(t_i)$, $I_1(t_i+1)$ ... $I_1(t_i+K)$) of the sample at different instants ($[t_i;\ t_i+K]$) forming an acquisition time range, each image being representative of an exposure light wave to which the image sensor is exposed;
c) on the basis of each acquired image of the sample, calculating an observation image at each instant ($I_{10}(t_i)$, $I_{10}(t_i+1)$ ... $I_{10}(t_i+K)$), the observation image corresponding to a spatial distribution of an optical path difference induced by the cells, or of an absorbance of the cells, in the sample plane ($P_{10}$);

(Continued)

d) using the observation images resulting from c) as input data of a supervised artificial intelligence algorithm ($CNN_d$, $CNN_p$), so as to predict or locate an occurrence of the cell event.

12 Claims, 9 Drawing Sheets

(52) U.S. Cl.
CPC ............... *G06T 2207/20081* (2013.01); *G06T 2207/20084* (2013.01); *G06T 2207/30024* (2013.01)

(58) Field of Classification Search
CPC .......... G06T 2207/30024; G06V 10/22; G06V 10/82; G06V 10/764; G06V 20/69
See application file for complete search history.

(56) References Cited

U.S. PATENT DOCUMENTS

| | | | |
|---|---|---|---|
| 2020/0124586 A1* | 4/2020 | Herve | ................... G03H 1/0866 |
| 2021/0130868 A1* | 5/2021 | Tao | ........................ G16H 50/20 |

* cited by examiner

METHOD FOR DETECTING A CELL EVENT

TECHNICAL FIELD

The technical field of the invention is the observation of a cell event, in particular cell division or cell death, with the aid of optical detection means.

PRIOR ART

The observation of cells is frequently confronted with the detection of events affecting the life of the cells, in particular cell division (mitosis or meiosis) or cell death.

Mitosis is a complex cell division process which is still the subject of in-depth studies. This is because the observation of mitoses is an important element for the study of pathologies involving misregulation of cell division, in particular cancer.

At present, mitoses are generally observed by microscopy, whether fluorescence microscopy, standard microscopy, by using a coloured marker, or phase contrast microscopy. In microscopy, however, the observation field is restricted because of the high magnification imparted by the objectives with which microscopes are equipped.

It may also be necessary to monitor the occurrence of a cell death. Currently, on the industrial scale, the main optical devices for estimating cell viability are based on employing viability markers and analyses of the colorimetric type (marking with trypan blue) or fluorescence type (marking with propidium iodide). An optical method without marking has been described in U.S. Ser. No. 10/481,076.

A difficulty may arise when there is a sample, comprising numerous cells, extending over a surface larger than the observation field of a microscope. If the intention is to obtain a sufficient observation statistic, it is difficult to observe different parts of the same sample simultaneously, even more so since mitoses occur at random instants.

Patent EP3519899A1 (or U.S. Ser. No. 10/754,141) describes a dual-mode observation device allowing a combination between lensless imaging and conventional microscopy. The aim is to benefit from the wide observation field of lensless imaging and the high resolution imparted by microscopy. The device makes it possible to switch between a first mode, in this case lensless imaging, allowing a wide-field observation of the sample, and a second mode, in this case microscopy, for observing details of the sample.

The invention described below makes it possible to automatically identify different parts, in which a cell event as described above is taking place, of a sample. This makes it possible to perform a count or to observe each division individually, by microscopy.

SUMMARY OF THE INVENTION

A first subject of the invention is a method for detecting or predicting the occurrence of a cell event, selected from between cell division or cell death, in a sample, the sample extending in at least one sample plane and comprising cells immersed in a medium, the method comprising the following steps:
a) arranging the sample between a light source and an image sensor;
b) illuminating the sample using the light source and acquiring a plurality of successive images of the sample using the image sensor, at different instants forming an acquisition time range, each image being representative of an exposure light wave to which the image sensor is exposed;
c) on the basis of each acquired image of the sample, calculating an observation image at each instant, the observation image corresponding to a spatial distribution of an optical path difference induced by the cells, or of an absorbance of the cells, in the sample plane;
the method further comprising:
d) using the observation images resulting from c) as input data of a supervised artificial intelligence algorithm, so as
to detect and locate an occurrence of the cell event during the acquisition time range;
or to predict an occurrence and a location of the cell event subsequent to the acquisition time range.

The optical path difference at each transverse coordinate corresponds to a difference between the optical path of the exposure light wave respectively in the presence and in the absence of a cell at the said transverse coordinate. The optical path difference may in particular correspond:
in the presence of a cell, to a difference between the respective refractive indices of the cell and the medium multiplied by the thickness of the said cell;
in the absence of a cell, to a value of zero.

During step c), each observation image may be calculated by using an iterative algorithm comprising the following substeps:
i) assigning parameters of the sample to different coordinates of the plane of the sample, at least one parameter being the optical path difference or the absorbance;
ii) calculating a complex image of the sample as a function of the parameters of the sample, the complex image of the sample being defined in the plane of the sample;
iii) propagating the complex image of the sample resulting from ii) so as to estimate an image acquired by the image sensor;
iv) comparing the image estimated during iii) with an image acquired by the image sensor at the same instant;
v) refreshing the parameters of the sample as a function of the comparison;
vi) repeating substeps ii) to v) while refreshing the complex image of the sample at each iteration with the aid of the parameters refreshed during substep v) of the preceding iteration, substeps ii) to v) being repeated for a number of predetermined iterations or until reaching a criterion for ending the iterations.

The method may comprise:
vii) using the parameters of the sample, which result from vi), as input data of an updating neural network for updating the parameters of the sample;
viii) then repeating substeps i) to vi) while using, in step i), the parameters, updated in step vii);

Step c) may comprise:
estimating a refractive index of cells;
taking into account a thickness of each cell along the propagation axis;
at each transverse coordinate corresponding to a cell, determining the optical path difference on the basis of the refractive index and the thickness of the cell.

According to one embodiment, the supervised artificial intelligence algorithm uses a convolutional neural network, the observation images being used as an input layer of the convolutional neural network.

Step d) may comprise detection and location of an occurrence of the cell event during the acquisition time range.

Step d) may comprise detection and location of an occurrence of the cell event during a temporal prediction interval subsequent to the acquisition time range.

The temporal prediction interval may occur between 10 minutes and 1 hour after the acquisition time range.

According to one possibility, no image forming optics are arranged between the sample and the image sensor.

According to one possibility, the image sensor used during step b) is a first image sensor, the method comprising, following step d), e) determining a region of interest, containing the cell division, of the sample;

f) positioning the sample in the object plane of an optical system, the optical system defining a magnification greater than 1, the optical system being coupled to a second image sensor;

g) acquiring an image of the region of interest of the sample using the second image sensor.

According to one possibility, the sample comprises a fluorescent marker, the fluorescent marker defining an excitation spectral band and a fluorescence spectral band, the method being such that during step g):

the sample is illuminated using a second light source, which is configured to illuminate the sample according to the excitation spectral band;

the image of the region of interest of the sample is acquired in the fluorescence spectral band.

A second subject of the invention is a device for observing a sample, comprising:

a light source;

an image sensor;

a support configured to hold the sample between the light source and the image sensor;

a processing unit configured to carry out steps c) and d) of a method according to the first subject of the invention on the basis of images acquired by the image sensor.

The invention will be understood more clearly on reading the description of the exemplary embodiments which are presented in the rest of the description, in connection with the figures listed below.

FIGURES

FIGS. 1A to 10 represent an example of a device making it possible to carry out the invention.

Figure 2A:
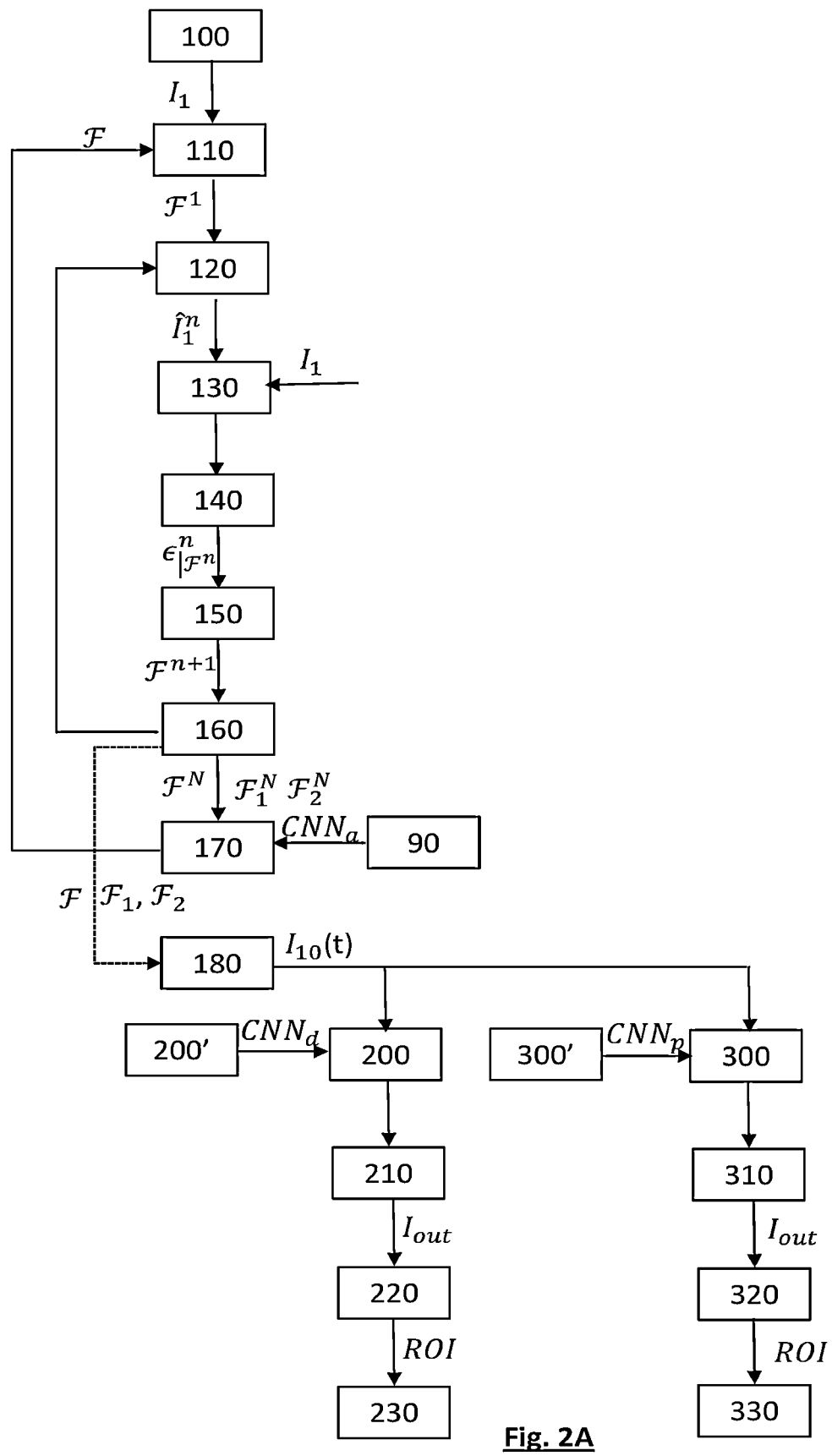
FIG. 2A represents the main steps of a method making it possible to detect or predict the occurrence of a cell division.
Figure 2B:
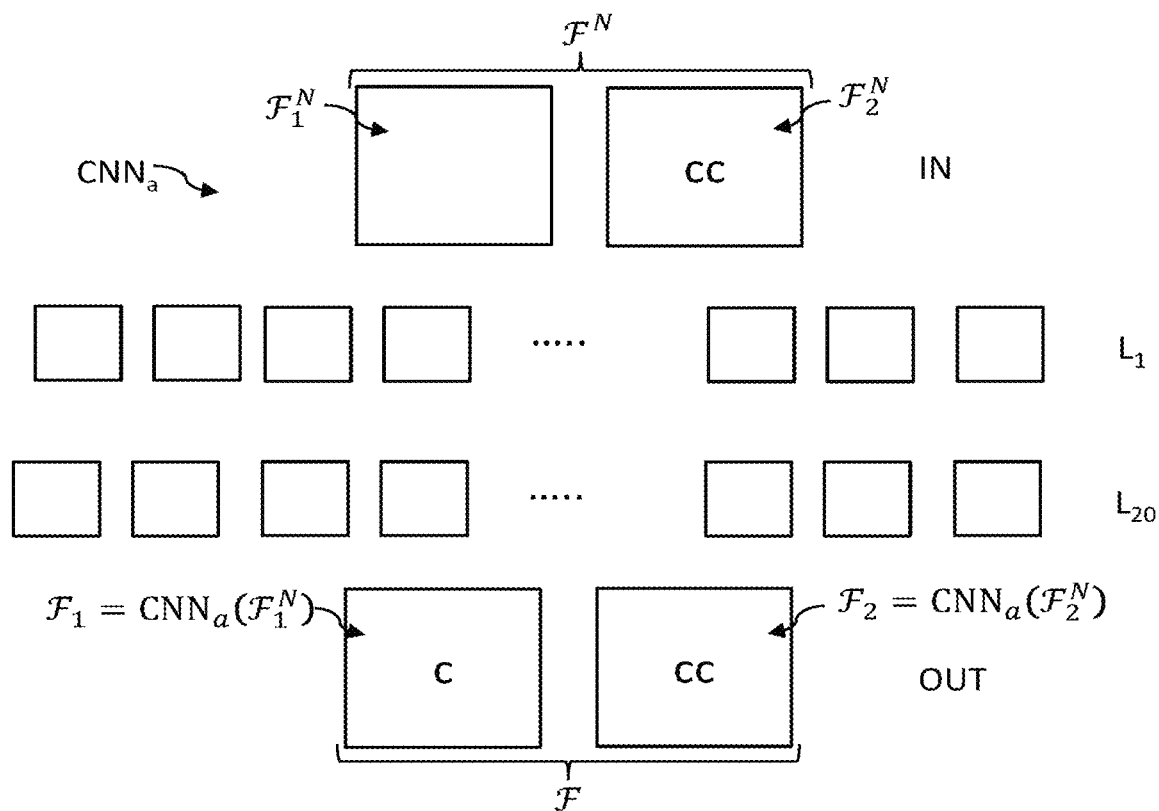

FIG. 2B schematises a convolutional neural network for updating.

Figure 3A:
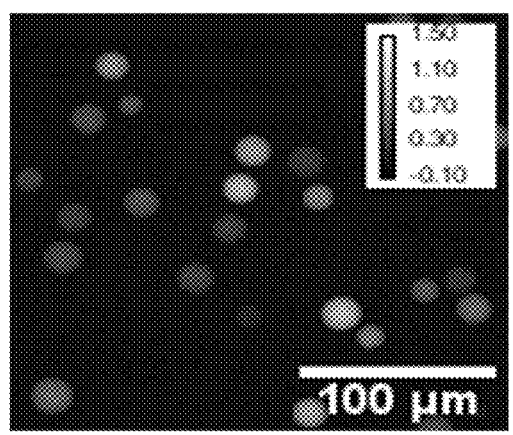
Figure 3B:
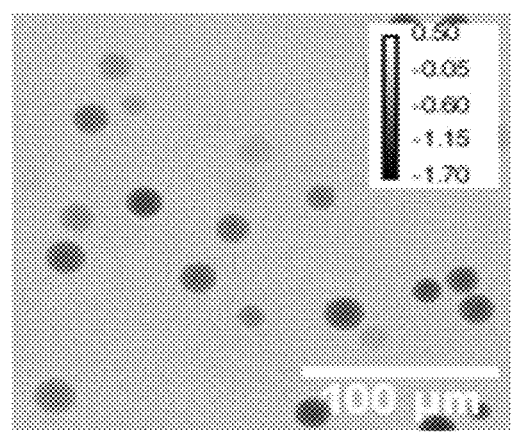

FIGS. 3A and 3B show images respectively of a real optical path difference of a sample and of a real absorbance of a sample.

Figure 3C:
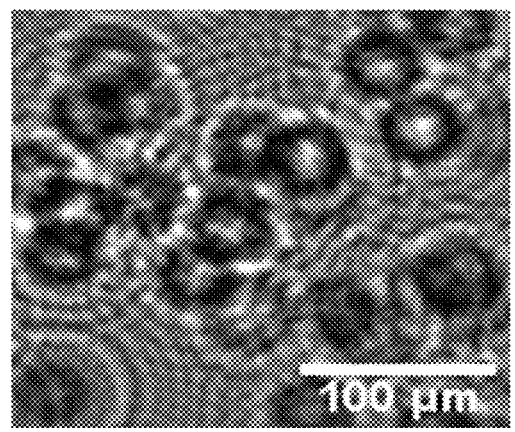

FIG. 3C is a simulation of an image acquired using an image sensor, this image being estimated with the aid of the images represented in FIGS. 3A and 3B.

Figure 3D:
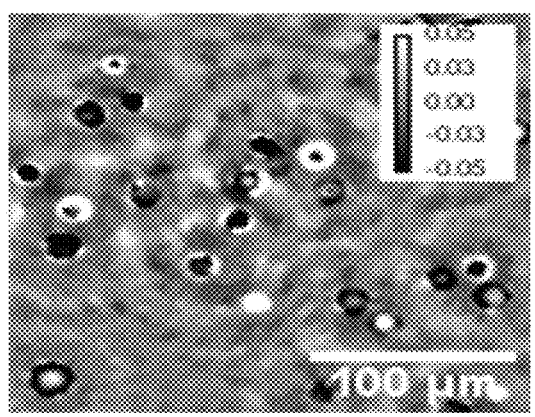
Figure 3E:
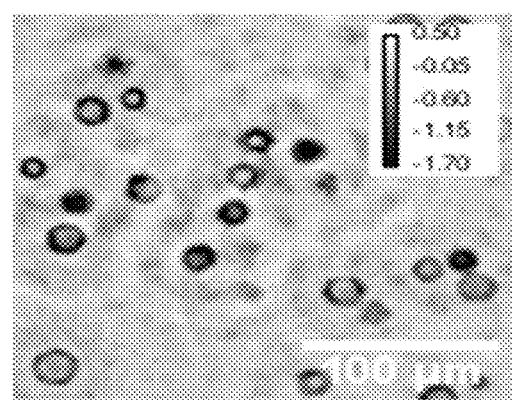

FIGS. 3D and 3E show images respectively of an optical path difference of a sample and of an absorbance, which were obtained on the basis of the image of FIG. 3C, by using an iterative reconstruction algorithm.

Figure 3F:
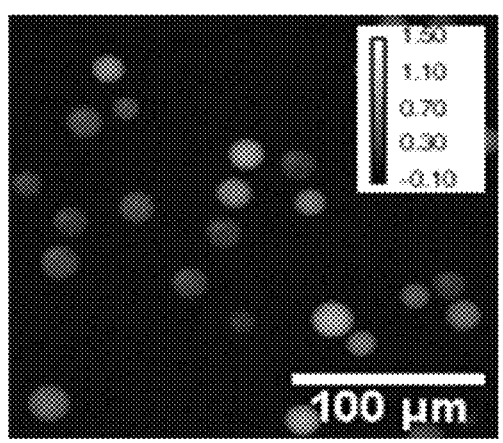
Figure 3G:
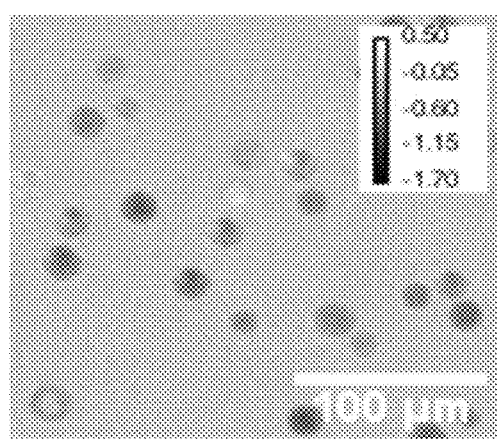

FIGS. 3F and 3G show images respectively of an optical path difference of a sample and of an absorbance, which were obtained by using an updating neural network on the basis of the images represented in FIGS. 3D and 3E.

Figure 3H:
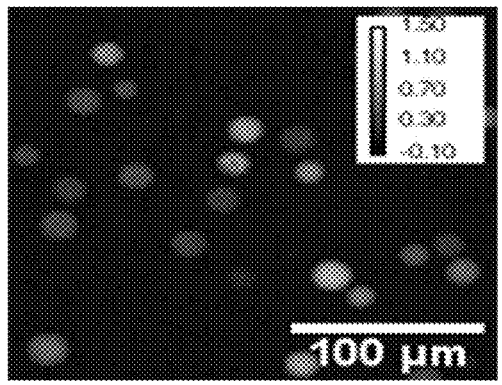
Figure 3I:
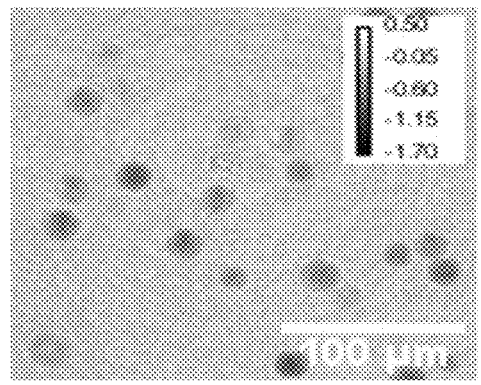

FIGS. 3H and 3I show images respectively of an optical path difference of a sample and of an absorbance, which were obtained using an iterative reconstruction algorithm initialised using the images of FIGS. 3F and 3G.

Figure 4:
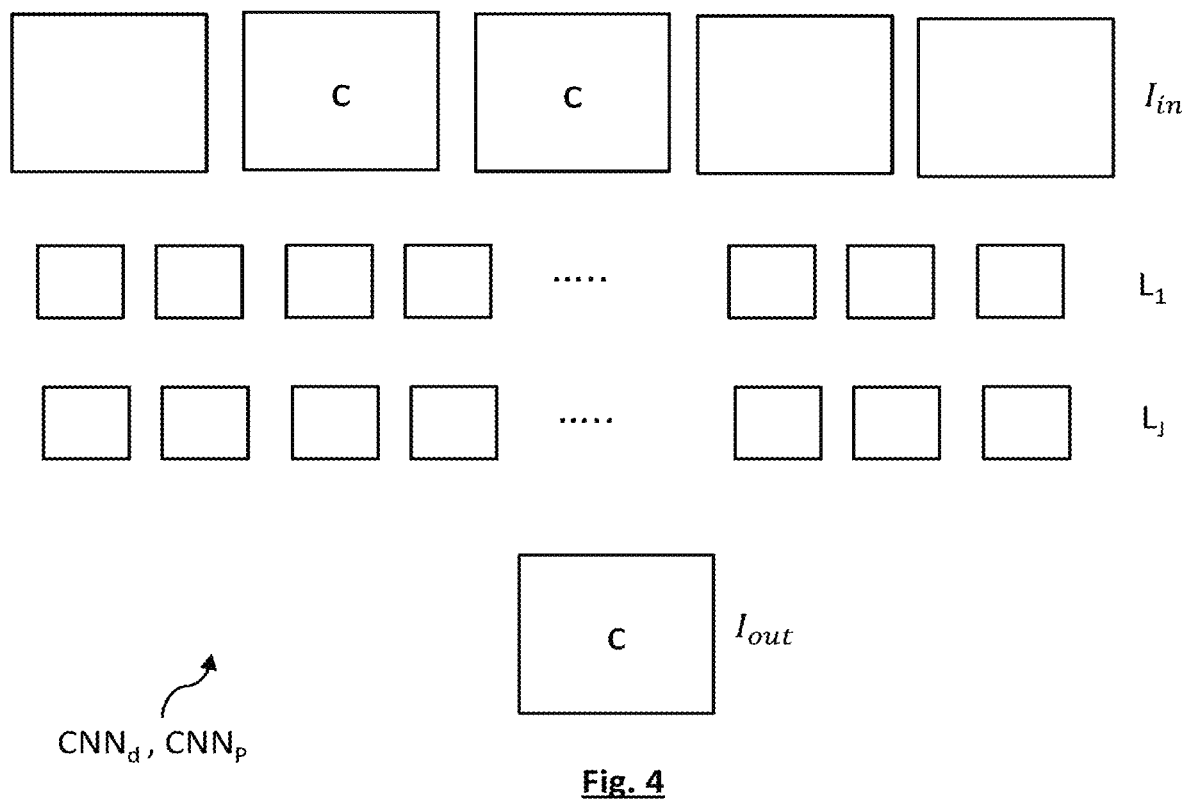

FIG. 4 schematises a convolutional neural network for detection or prediction.

Figure 5A:
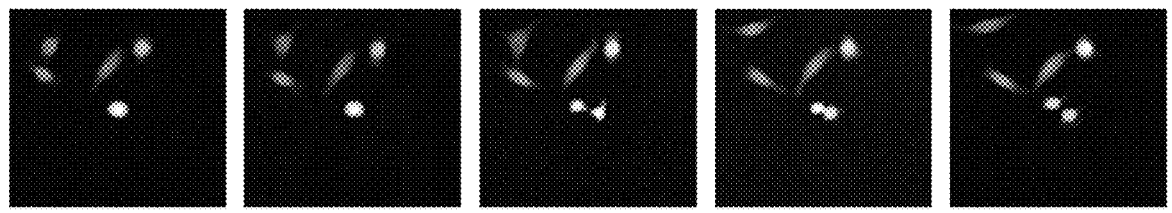
Figure 5B:
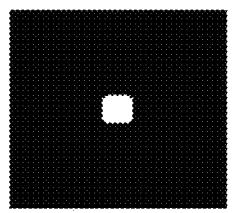

FIGS. 5A and 5B show a training dataset of a neural network for detecting mitosis.

Figure 5C:
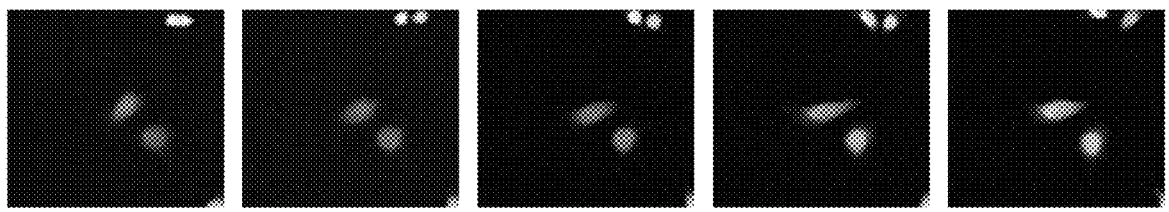
Figure 5D:
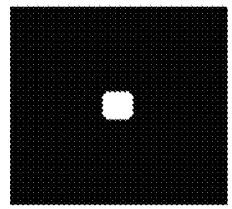

FIGS. 5C and 5D show a training dataset of a neural network for predicting mitosis.

Figure 5E:
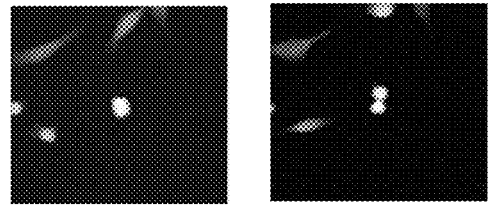

FIG. 5E shows observation images of a sample making it possible to conclude that a mitosis has occurred, so as to produce the image 5D.

Figure 5F:
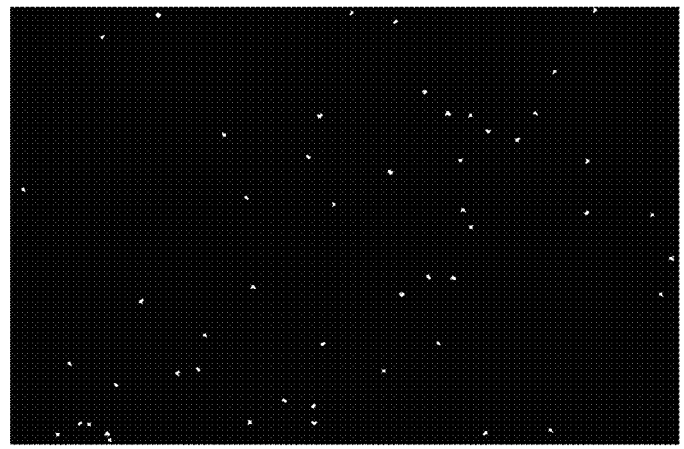

FIG. 5F is an output image of a neural network for predicting a cell division.

Figure 6A:
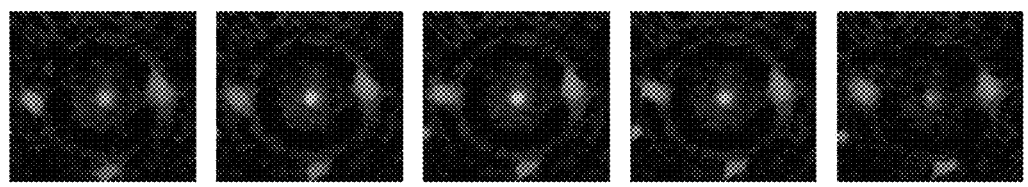
Figure 6B:
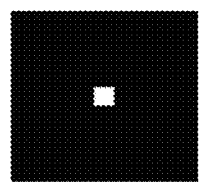

FIGS. 6A and 6B show a training dataset of a neural network for detecting cell death.

Figure 6C:
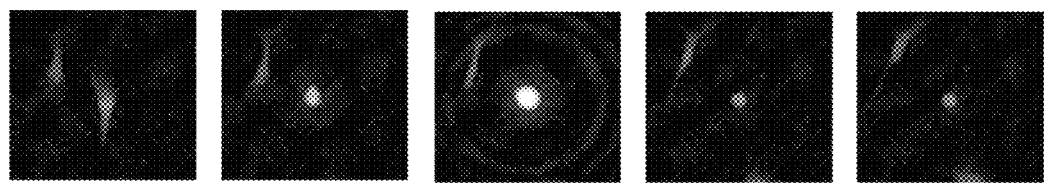
Figure 6D:
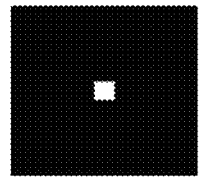

The same is true of FIGS. 6C and 6D.

Figure 7:
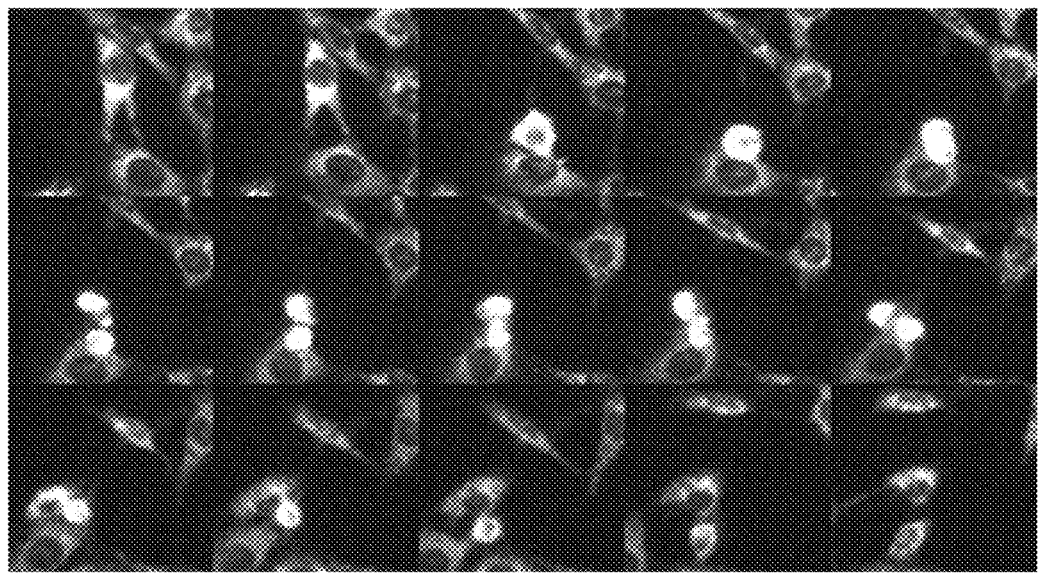

FIG. 7 shows a series of fluorescence microscopy images, all acquired 10 minutes before, during and after an occurrence of a mitosis.

Figure 8:
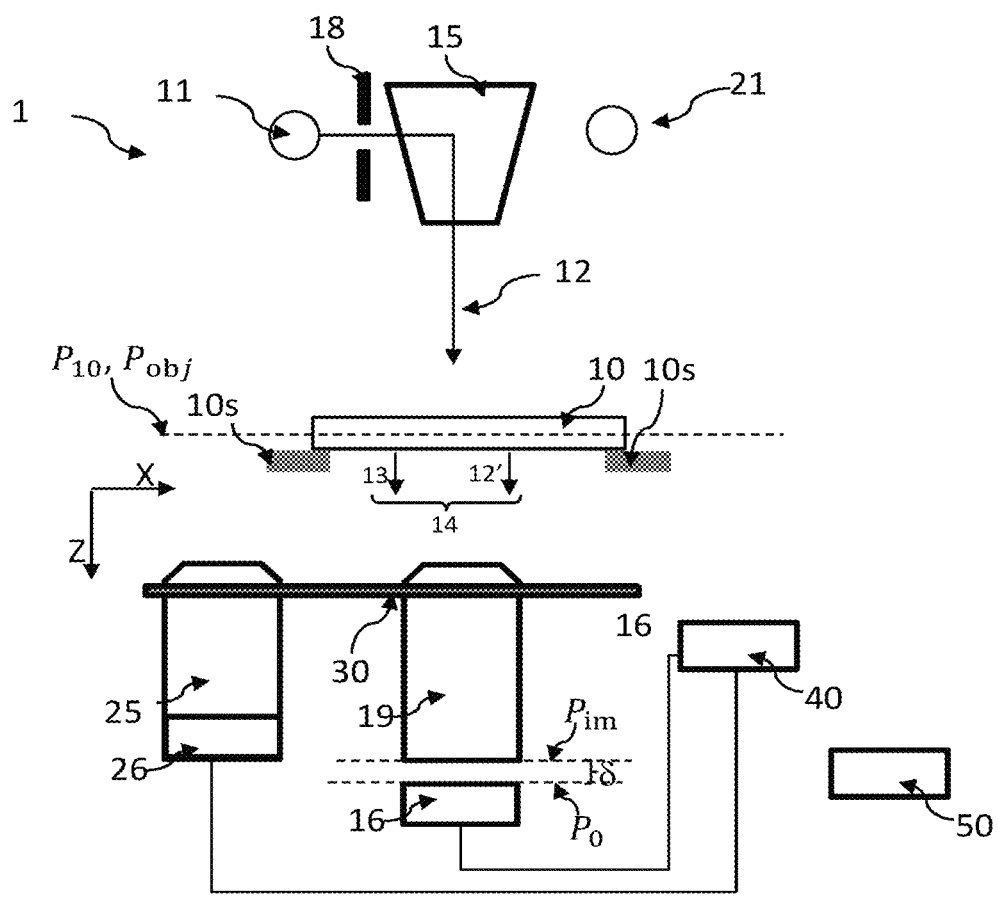

FIG. 8 represents another example of a device making it possible to carry out the invention.

DESCRIPTION OF PARTICULAR EMBODIMENTS

Figure 1A:
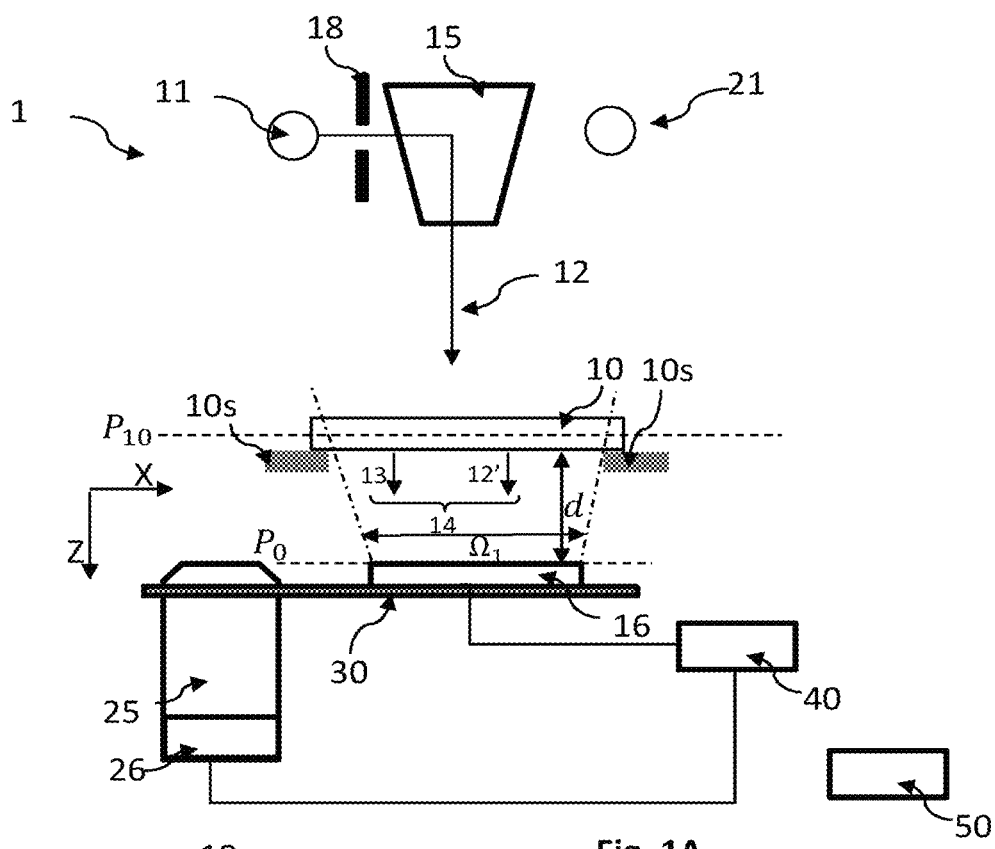
Figure 1B:
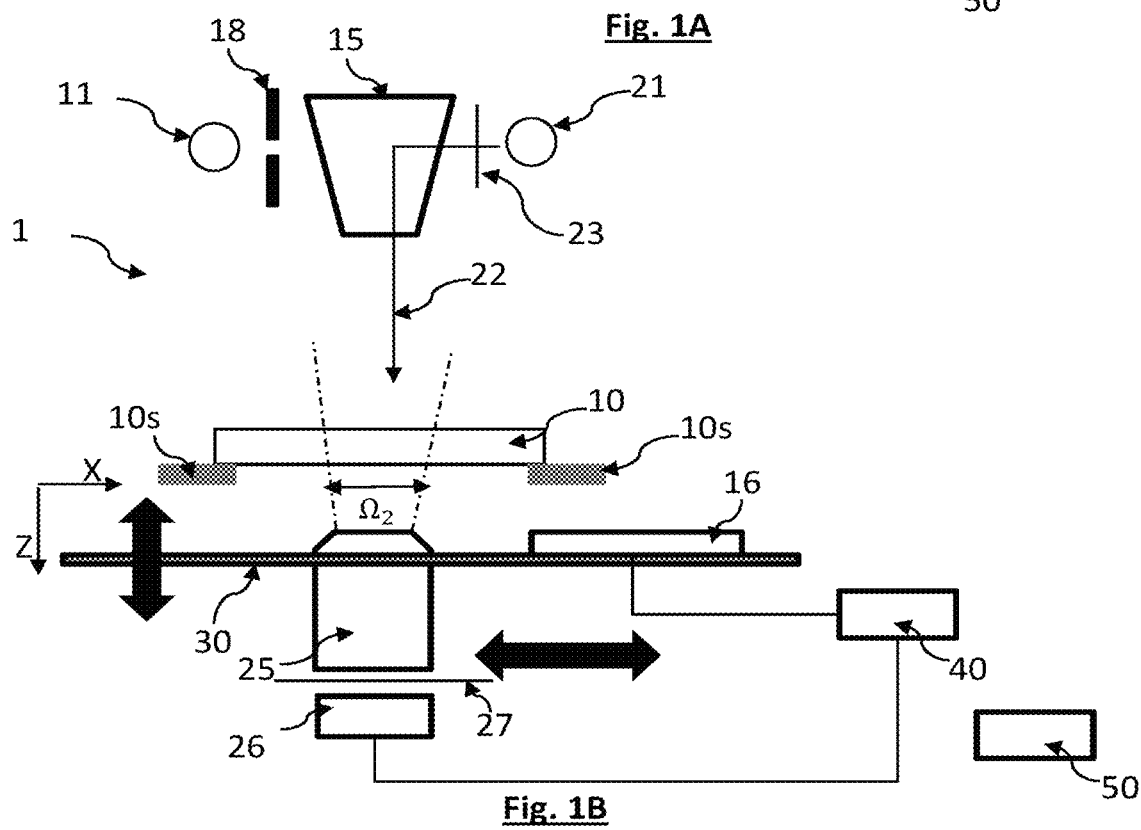
Figure 1C:
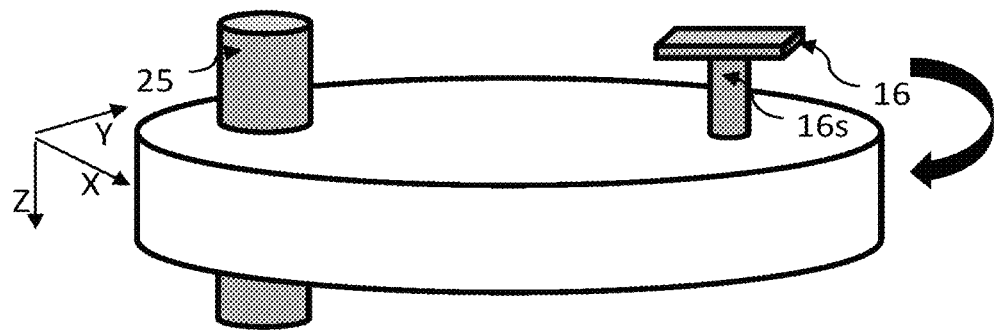

FIGS. 1A, 1B and 1C represent an example of a device 1 for observing a sample, making it possible to carry out the invention. It is a device making it possible to observe a sample according to a lensless first imaging mode and a second mode of conventional imaging, with focused imaging, by using an objective making it possible to obtain a magnification of the image. The observation device is based on the dual-mode device described in EP3519899A1 (U.S. Ser. No. 10/754,141), which was cited in the prior art. FIG. 1A represents the device configured according to the lensless imaging mode, whereas FIG. 1B shows the device configured according to a focused microscopy mode, for example with fluorescence imaging.

The device comprises a first light source 11 capable of emitting a first light wave 12, referred to as the incident light wave, which propagates towards a sample 10 along a propagation axis Z, in a first spectral band $\Delta\lambda$.

The sample 10 is arranged on a sample support $10_s$. The sample comprises a culture medium $10_m$ in which cells $10_p$ are immersed. The culture medium is a medium conducive to the development of cells.

In this example, the sample comprises a fluorescent marker $10_f$ adapted to make it possible to form fluorescence images making it possible to observe mitosis. The fluorescent marker generates fluorescence light in a fluorescence spectral band when it is illuminated by excitation light in an excitation spectral band. As an alternative, the sample may comprise a coloured marker. Employing a coloured or fluorescent exogenous marker is not an essential element of the invention. Such a marker is useful only when a focused microscopy mode as described below is being used.

The thickness of the sample 10 along the propagation axis Z is preferably between 20 μm and 500 μm. The sample extends in at least one plane $P_{10}$, referred to as the plane of the sample, which is preferably perpendicular to the propagation axis Z. It is held on the support $10_s$ at a distance d from a first image sensor 16. The plane of the sample is defined by the axes X and Y represented in FIG. 1A.

Preferably, the optical path travelled by the first light wave 12 before reaching the sample 10 is more than 5 cm. Advantageously, as seen by the sample, the first light source is considered to be a point source. This means that its diameter (or its diagonal) is preferentially less than one tenth, more preferably than one hundredth of the optical path between the sample and the light source. The first light source 11 may, for example, be a light-emitting diode or a laser source, for example a laser diode. It may be associated with an aperture 18, or spatial filter. The aperture is not necessary, in particular when the light source is sufficiently point-like, especially when it is a laser source.

Preferably, the spectral band Δλ of the incident light wave 12 has a width of less than 100 nm. The spectral bandwidth is intended to mean the full width at half maximum of the said spectral band.

The device as represented in FIG. 1A comprises a prism 15 capable of reflecting the incident light wave 12 towards the sample 10. Employing such a prism makes it possible to keep the light sources immobile with respect to the sample. Such a prism is optional.

The first image sensor 16 is capable of forming an image $I_1$ in a detection plane $P_0$. In the example represented, it is an image sensor comprising a matrix of pixels, of the CCD type, or a CMOS, the surface of which is generally more than 10 mm². The surface of the matrix of pixels, referred to as the detection surface, depends on the number of pixels and their size. It is generally between 10 mm² and 50 mm². The detection plane $P_0$ preferably extends perpendicularly to the propagation axis Z of the incident light wave 12. The distance d between the sample 10 and the matrix of pixels of the image sensor 16 is preferentially between 50 μm and 2 cm, preferably between 100 μm and 2 mm.

The absence of magnifying optics between the first image sensor 16 and the sample 10 will be noted. This does not preclude the optional presence of focusing microlenses at each pixel of the first image sensor 16, these not having the function of magnifying the image acquired by the first image sensor.

Because of the proximity between the first image sensor 16 and the sample 10, the image $I_1$ (or first image) acquired by the first image sensor extends in a first observation field $\Omega_1$ slightly smaller than the area of the first image sensor 16, that is to say typically between 10 mm² and 50 mm². This is a large observation field when comparing it with the observation field provided by a high-magnification microscope objective, for example an objective with a magnification of more than 10, as described below in connection with the second mode. Thus, the image $I_1$ acquired by the first image sensor 16 makes it possible to obtain usable information of the sample in a large first observation field $\Omega_1$. One important element of the invention is to profit from this large observation field in order to select a region of interest ROI of the sample on the basis of the image $I_1$, then to analyse the selected region of interest by focused imaging, for example fluorescence imaging, according to the second optical mode.

The observation device 1 may comprise a second light source 21, as well as an optical system 25 provided with a magnification of more than 1. The second light source 21 emits a second light wave 22 which propagates to the sample. A second image sensor 26 is coupled to the optical system 25, the second image sensor 26 being arranged in the focal image plane of the optical system 25. The optical system defines a magnification preferably of the order of or more than 10. The second image sensor 26 makes it possible to obtain detailed information of the selected region of interest ROI of the sample. Because of the magnification of the optical system 25, the observation field $\Omega_2$ of the second image sensor 26 is reduced in comparison with the first observation field $\Omega_1$. The second image sensor 26 is configured to form an image of the region of interest with a high resolution. The second image sensor 26 makes it possible to acquire a second image $I_2$, with a high spatial resolution, through the objective 25.

The sample may comprise a cell marker. This may be a fluorescent marker or a coloured marker. When the marker is fluorescent, the second light wave 22 is emitted in an excitation spectral band of the fluorescent marker. The second image sensor is configured to form an image in the fluorescence spectral band of the fluorescent marker. It is, for example, coupled to a bandpass filter 27 delimiting a passband included in the fluorescence spectral band of the fluorescent marker. The second image thus makes it possible to obtain a detailed representation of the fluorescence of a region of interest ROI identified on the first image $I_1$. When the cell marker is a fluorescent marker, the second light source may be coupled to an excitation filter 23 which defines a passband included in the excitation spectral band of the fluorescent marker. A fluorescence image makes it possible to observe accurately the development of certain subcellular structures during the cell event considered: cell division or cell death.

The first light source 11 and the second light source 21 may be arranged facing the sample 10 and activated successively, in which case the prism 15 is superfluous.

According to one possibility, the first light source 11 and the second light source 21 form a single light source.

Preferably, the sample 10 is kept immobile between the first observation mode and the second observation mode, whereas the first image sensor 16 and the optical system 25/second image sensor 26 assembly are moved relative to the sample between the two observation modes. A mobile plate 30, which supports the first image sensor 16 and the optical system 25/image sensor 26 assembly and allows them to be moved relative to the sample 10, has been represented in FIGS. 1A, 1B and 1C. As illustrated in FIG. 1B, the mobile plate may be configured parallel and perpendicularly to the propagation axis Z of the light. A control unit 40 may control the mobile plate 30 so as to determine, in each mode, a relative position of the sample 10 with respect to the first image sensor 16 or with respect to the optical system 25/second image sensor 26 assembly.

As an alternative, the sample is mounted on a mobile support $10_s$, making it possible to move it either facing the first image sensor 16 or facing the optical system 25/second image sensor 26 assembly. The image sensor may also be arranged on a support 16$s$, as represented in FIG. 1C.

Preferably, the relative movement of the first image sensor 16 and the optical system 25 is calculated automatically by the control unit 40 as a function of the region of interest ROI of the sample which has been selected on the basis of the first image $I_1$.

As described below, one of the aims of the invention is to detect or predict the occurrence of a cell event on the basis of images $I_1$ acquired according to the first mode. The detection or prediction makes it possible to define a region of interest ROI in which the cell event is occurring. The multimode device makes it possible to form a high-resolution image $I_2$ according to the second mode. This leads to sharper observation of the cell event. As mentioned above, the cell event may be a cell division (mitosis or meiosis) or a cell death. The region of interest ROI may be defined automatically on the basis of images $I_1$ and transmitted to the control unit 40. The latter then actuates the plate 30 in order to place the sample in the second analysis mode, that is to say facing the objective 25, so that the region of interest ROI is in the object plane of the objective 25.

One important aspect of the invention relates to the detection or prediction of an occurrence of a cell event in the sample on the basis of an image $I_1$ acquired according to the first mode. The first mode may be implemented independently of the second mode. In this case, the first mode may make it possible to carry out detection of the cell event without marking. This avoids employing a coloured marker or a fluorescent marker. When the first mode is implemented independently, the device may comprise a single light source 11 and a single image sensor 16.

During the acquisition of an image $I_1$ according to the first mode, under the effect of the incident light wave 12, the sample may give rise to a diffracted wave 13 capable of producing, in the detection plane $P_0$, interference with a part of the incident light wave 12 transmitted by the sample. During the acquisition of the image $I_1$ according to the first mode, the first image sensor 16 is exposed to an exposure light wave 14. The exposure light wave 14 transmitted by the sample 10 comprises:
- a component 13 resulting from the diffraction of the first incident light wave 12 by the sample;
- a component 12' transmitted by the sample and resulting from the absorption of the first incident light wave 12 by the sample.

These components form interference in the detection plane $P_0$. Thus, each image $I_1$ acquired by the first image sensor 16 according to the first mode comprises interference patterns (or diffraction patterns), each interference pattern being generated by the sample.

The device comprises a processing unit 50 configured to process each image $I_1$ acquired by the first image sensor 16 according to the first mode, so as to detect or predict the occurrence of a cell division in the sample. The processing unit 50 may comprise a processor configured to carry out the steps described below in connection with FIG. 2A.

According to a first approach, the sample is considered to be described by parameter vectors $F(x,y)$, each parameter vector being defined at a transverse coordinate $(x,y)$ in the plane $P_{10}$ of the sample. Each term of each vector corresponds to an optical property of the sample at the coordinate $(x,y)$. The expression "transverse coordinate" designates coordinates in a plane perpendicular to the propagation axis Z.

At least one term of each vector may be an optical path difference $a_x, y)$, induced by the sample, along the propagation axis Z. The sample is considered to have a refractive index $n_p$ in each cell $10_p$, whereas the culture medium $10_m$ in which it is immersed has a refractive index $11_m$. At each transverse coordinate $(x,y)$, it is considered that the optical path difference $L(x,y)$ induced by a cell positioned at the said coordinate is such that:

$$L(x,y) = (n_p - n_m) \times e(x,y) \qquad (1)$$

where $e(x,y)$: thickness of the cell at the transverse coordinate $(x,y)$ and $\times$ is the multiplication operator. In other words, the optical path difference induced by the sample corresponds to a difference between:
- the optical path followed by the exposure wave 14 during its propagation through the sample, under the effect of the presence of a cell at the coordinate $(x,y)$;
- the optical path followed by the exposure wave 14 in the absence of a cell at the said coordinate.

At each coordinate $(x,y)$, it is possible to define an optical path difference $L(x,y)$. When there is no cell at $(x,y)$, $L(x,y)=0$. In the presence of a cell, $L(x,y)=(n_p-n_m) \times e(x,y)$.

The optical path difference of the sample $L(x,y)$ is therefore defined as a function of the refractive index of a cell and of the thickness of a cell occupying a coordinate $(x,y)$. The thickness of the cell is defined parallel to the propagation axis Z.

The parameter vector $F(x,y)$ has a dimension $(1, N_w)$, where $N_w$ denotes the number of parameters considered for each transverse coordinate $(x,y)$. Another term of each vector $F(x,y)$ may be an absorbance $\alpha(x,y)$ of the sample.

In the example considered, $N_w=2$. Each vector $F(x,y)$ is such that:

$$F(x,y) = \begin{bmatrix} L(x,y) = F_{w=1}(x,y) \\ \alpha(x,y) = F_{w=2}(x,y) \end{bmatrix}$$

A first part of the processing carried out by the processing unit 50 consists in obtaining an observation image $I_{10}$ of the sample on the basis of each image $I_1$ acquired according to the first mode. The observation image is a usable image of the sample, making it possible to detect or predict a cell division. The observation image of the sample may in particular be an image of the optical path difference $L(x,y)$ of the sample, the latter being discretised at a plurality of transverse coordinates $(x,y)$. It may also be an image of the absorbance $\alpha(x,y)$ of the sample. The observation image $I_{10}$ may be obtained as described in application U.S. Pat. No. 16,907,407.

A second part of the processing consists in using different observation images, respectively coming from different images acquired according to the first mode, in order to detect or predict a cell division.

The processing of each image $I_1$ acquired according to the first mode follows the steps in FIG. 2A.

Steps 100 to 180 constitute the first part of the processing, aiming to form the observation image $I_{10}$ of the sample. The main principles have been explained here, knowing that details are given in application U.S. Pat. No. 16,907,407.

Step 100: Illumination of the sample 10 with the aid of the light source 11, and acquisition of an image $I_1$ of the sample 10 according to the first mode by the first image sensor 16. This image forms a hologram of the sample.

The image $I_1$ acquired by the first image sensor 16 is an image of the exposure light wave 14. The exposure light wave 14 may be defined at each transverse position $(x,y)$ in the plane $P_{10}$ of the sample by a complex expression, so that:

$$A_{10}(x,y) = b(x,y) \exp\left(2i\pi \frac{L(x,y)}{\lambda} + \alpha(x,y)\right), \qquad (2)$$

where:
- $\lambda$ corresponds to a wavelength representative of the exposure light wave 14: this may be a central wavelength of the spectral band $\Delta\lambda$ in which the incident light wave 12 is emitted.
- $b(x,y)$ is an amplitude representative of the incident light wave 12 reaching the sample. This amplitude may be measured by the first image sensor 16 in the absence of a sample 10 on the support $10_s$. The first light source 11 then illuminates the first image sensor 16 directly, the latter then forming an image $I_{1,0}$. On the basis of the image $I_{1,0}$ acquired by the first image sensor 16 in the absence of a sample, $b(x,y)$ is obtained by $b(x,y) = \sqrt{I_{1,0}(x,y)}$ (1').

L(x,y) and α(x,y) correspond respectively to the optical path difference and the absorbance at the coordinate (x,y).

When it is considered that a cell occupying a position (x,y) is transparent, α(x,y)=0. When the cell absorbs a part of the light, α(x,y)<0.

Step 110: Initialisation of the parameter vectors F(x,y) defined at each transverse coordinate of the sample.

The terms making up the initial parameter vector are defined arbitrarily or on the basis of an assumption about the sample. This step is carried out for each transverse coordinate (x,y) considered. The parameter vectors F(x,y) defined during this step form a set $\mathcal{F}^1$ of vectors describing the sample 10. Each initialised vector is denoted $F^1(x,y)$. A possible initialisation of the parameter vector as a function of parameters resulting from step 170 is described below.

Steps 120 to 150 are then carried out iteratively, each iteration being allocated a rank n, n being a natural number. In the first iteration, n=1. During each iteration, a set of parameters $\mathcal{F}^n$ of parameter vectors $F^n(x,y)$ resulting from step 110 or a preceding iteration is considered. The superscript n designates the rank of the iteration.

Step 120: Estimation $\hat{I}_1^n$ of the image $I_1$ acquired by the first image sensor 16 during step 100, on the basis of the set $\mathcal{F}^n$ of parameter vectors $F^n(x,y)$.

At each position (x,y), a complex expression $A_{10}^n(x,y)$ of the exposure light wave 14 in the plane $P_{10}$ of the sample is calculated according to expression (2) on the basis of the parameter vectors $F^n(x,y)$. Each complex expression $A_{10}^n(x,y)$ at different coordinates (x,y) forms a complex image $A_{10}^n$ of the sample.

On the basis of the complex image $A_{10}^n$ calculated in the plane of the sample according to (2), application of a holographic propagation operator $h_{P_{10} \to P_0}$ so as to obtain a complex image $A_0^n$ of the exposure light wave 14 in the detection plane $P_0$, according to the expression:

$$A_0^n = A_{10}^n * h_{P_{10} \to P_0} \quad (3).$$

$h_{P_{10} \to P_0}$ is a holographic propagation operator, usually used in the field of holographic reconstruction, making it possible to propagate the plane $P_{10}$ of the sample towards the detection plane $P_0$. It may be a Fresnel operator, for example:

$$h(x, y, z) = \frac{1}{i\lambda z} e^{j2\pi \frac{z}{\lambda}} \exp\left(i\pi \frac{x^2 + y^2}{\lambda z}\right). \quad (4)$$

In general, the holographic propagation operator models transport of the exposure light wave between at least two points distant from one another. In the application described, the convolution product described in connection with equation (3) models transport of the exposure light wave 14 between the plane $P_{10}$ of the sample and the detection plane $P_0$.

By considering the square root of the modulus of the complex image $A_0^n$, an estimation $\hat{I}_1^n$ of the image $I_1$ acquired by the image sensor 16 during step 100 is obtained. Thus, $$\hat{I}_1^n = \sqrt{\text{mod}(A_0^n)} \quad (5),$$

where mod designates the modulus operator.

Step 130: Comparison of the image $\hat{I}_1^n$ estimated during step 120 with the image $I_1$ acquired by the image sensor during step 100. The comparison may be expressed in the form of a difference or a ratio, or of a mean square deviation.

Step 140: Determination of a validity indicator $\epsilon_{|\mathcal{F}^n}^n$ of the estimation $\hat{I}_1^n$.

During this step, a validity indicator $\epsilon_{|\mathcal{F}^n}^n$ representing the relevance of the set $\mathcal{F}^n$ of vectors $F^n(x,y)$ describing the sample is calculated. The index $|\mathcal{F}^n$ signifies that the validity indicator $\epsilon_{|\mathcal{F}^n}^n$ is established while knowing the set $\mathcal{F}^n$ of vectors $F^n(x,y)$. In this example, the validity indicator is commensurately lower when the sample is described correctly by the set $\mathcal{F}$.

The validity indicator $\epsilon_{|\mathcal{F}^n}^n$ comprises an error criterion $\epsilon_{0|\mathcal{F}^n}^n$, the latter quantifying a global error of the estimated image $\hat{I}_1^n$ in relation to the measured image $I_1$. A global error is intended to mean an error for each coordinate (x,y). In this example, the error criterion $\epsilon_{0|\mathcal{F}^n}^n$ is a scalar.

The error criterion $\epsilon_{0|\mathcal{F}^n}^n$ is established on the basis of the comparison of the images $\hat{I}_1^n$ and $I_1$. For example, $$\epsilon_{0|\mathcal{F}^n}^n = \frac{1}{N_{x,y}} \int\int \left| \frac{I_1(x,y) - \hat{I}_1^n(x,y)}{I_1(x,y)} \right| dxdy \quad (6)$$

According to one possibility, $\epsilon_{|\mathcal{F}^n}^n = \epsilon_{0|\mathcal{F}^n}^n$ According to another possibility, as described in Application US20200124586, the validity indicator $\epsilon_{|\mathcal{F}^n}^n$ also takes into account a morphological criterion $\epsilon_{10|\mathcal{F}^n}^n$. Unlike the error criterion $\epsilon_{0|\mathcal{F}^n}^n$, which is defined on the basis of data measured or estimated in the detection plane $P_0$, the morphological criterion $\epsilon_{10|\mathcal{F}^n}^n$ is defined in the plane $P_{10}$ of the sample.

The morphological criterion $\epsilon_{10|\mathcal{F}^n}^n$ may be such that:

$$\epsilon_{10|\mathcal{F}^n}^n = \int\int \sqrt{\left(\frac{\partial L^n(x,y)}{\partial x}\right)^2 + \left(\frac{\partial L^n(r)}{\partial y}\right)^2} \, dxdy \quad (7)$$

$L^n(x,y)$ is the optical path difference estimated during an iteration of rank n.

In this example, the morphological criterion is a scalar.

This criterion tends to decrease when the quantity $L^n(x,y)$ has an oscillation minimum, which is the case for example when the particles have a spherical or hemispherical particle morphology. The values of $L^n(x,y)$ for which the criterion $\epsilon_{10|\mathcal{F}^n}^n$ is minimal therefore correspond to for example spherical or hemispherical particles isolated from one another, with an oscillation minimum of $L^n(x,y)$ between the particles or on them.

According to one possibility, $$\epsilon_{10|\mathcal{F}^n}^n = \int\int \sqrt{\left(\frac{\partial L^n(x,y)}{\partial x}\right)^2 + \left(\frac{\partial L^n(r)}{\partial y}\right)^2} \, dxdy + \quad (7')$$

$$\frac{1}{10} \int \sqrt{(L^n(x,y))^2} \, dxdy + \frac{1}{10} \int \alpha^{n2}(x,y) dxdy +$$

$$10 \int \alpha^{n2}(x,y) dxdy [\alpha(x,y) > 0] +$$

-continued $$10 \int \sqrt{(L^n(x,y))^2} \, dx dy [L(x,y) < 0]$$

where $[\alpha^n(x,y)>0]$ and $[L^n(x,y)<0]$ designate the fact that the quantities $10\int \alpha^{n2}(x,y)dxdy$ and $10\int \sqrt{(L^n(x,y))^2}dxdy$ are taken into account only if $\alpha^n(x,y)>0$ and $L^n(x,y)<0$, respectively.

The validity indicator $\epsilon_{|\mathcal{F}^n}$ may thus be expressed by combining expressions (6) and (7), so that:

$$\epsilon^n_{|\mathcal{F}^n} = \epsilon^n_{|\mathcal{F}^n} = \epsilon^n_{0|\mathcal{F}^n} + \gamma \epsilon^n_{10|\mathcal{F}^n} \quad (8)$$

or, taking into account (7)

$$\epsilon^n_{|\mathcal{F}^n} = \frac{1}{N_{x,y}} \int \int \left| \frac{I_1(x,y) - \hat{I}^n_1(x,y)}{I_1(x,y)} \right| dxdy +$$

$$\gamma \int \int \sqrt{\left(\frac{\partial L^n(x,y)}{\partial x}\right)^2 + \left(\frac{\partial L^n(r)}{\partial y}\right)^2} \, dxdy \quad (9)$$

where $\gamma$ is a positive weighting factor.

Step 150: Refreshing of the vectors F''(x,y) by minimisation of the validity indicator $\epsilon^n_{|\mathcal{F}^n}$. The validity indicator $\epsilon^n_{|\mathcal{F}^n}$ is a scalar variable. However, it depends on the set $\mathcal{F}^n$ of parameter vectors, on the basis of which it has been established, by means of the image $\hat{I}^n_1$.

During step 150, a minimisation algorithm of the gradient descent type is applied so as to progressively approach, at each iteration, the set $\mathcal{F}^n$ allowing satisfactory minimisation of the validity indicator $\epsilon^n_{|\mathcal{F}^n}$. Thus, the objective of this step is to establish a set $\mathcal{F}^{n+1}$ of vectors $F^{n+1}(x,y)$ aiming to obtain, after repetition of steps 110 to 140, a validity indicator $\epsilon^{n+1}_{|\mathcal{F}^{n+1}}$ lower than the validity indicator $\epsilon^n_{|\mathcal{F}^n}$ of the current iteration. This step makes it possible to refresh at least one term $F_w^n(x,y)$ of each vector F''(x,y).

For this purpose, a gradient $G_w^n(x,y)$ of the validity indicator $\epsilon^n_{|\mathcal{F}^n}$ with respect to the optical parameter corresponding to the term $F_w^n(x,y)$, is defined, so that:

$$G_w^n(x,y) = \frac{\partial \epsilon^n_{|\mathcal{F}^n}}{\partial F_w^n(x,y)}. \quad (10)$$

A gradient descent algorithm then defines a direction $d_w^n$ as well as an increment $\sigma_w^n$. The term $F_w^n(x,y)$ of each parameter vector is refreshed according to the expression:

$$F_w^{n+1}(x,y) = F_w^n(r) + d_w^n \sigma_w^n \quad (11)$$

The gradient $G_w^n(x,y)$ may be defined for each term $F_w^n(x,y)$ of each vector F''(x,y).

Step 160: Repetition of steps 120 to 150 while taking into account during the following iteration step 120 the set $\mathcal{F}^{n+1}$ refreshed during the step 150 of the iteration carried out last.

Steps 120 to 160 are repeated until the value of the validity indicator $\epsilon^n_{|\mathcal{F}^n}$ is considered to be representative of a good description of the sample by the set $\mathcal{F}^n$ of vectors F''(x,y). When taking into account an indicator as defined in equations (8) or (9), the iterations cease when the value of the validity indicator $\epsilon^n_{|\mathcal{F}^n}$ is sufficiently low.

Step 170: Updating of the set $\mathcal{F}^n$ of vectors F''(x,y).

During this step, the set $\mathcal{F}^n$ of vectors F''(x,y) is subjected to an update by using a convolution neural network $CNN_a$, referred to as the updating neural network. The convolutional neural network comprises two input layers IN and as many output layers OUT.

The updating neural network $CNN_a$ comprises two input layers IN. Each input layer IN represents a spatial distribution of a parameter $F_w^N$ describing the sample, as refreshed during the last iteration of steps 120 to 160. N designates the rank of the last iteration. In this example, the first input layer represents a spatial distribution $\mathcal{F}_1^N$ of the first parameter $F_1^N(x,y)$, in this case the optical path difference $L^N(x,y)$, in the plane of the sample, whereas the second input layer represents a spatial distribution $\mathcal{F}_2^N$ of the second parameter $F_2^N(x,y)$, in this case the absorbance $\alpha^N(x,y)$, in the plane of the sample.

In general, the algorithm is implemented on the basis of at least one input layer IN corresponding to a spatial distribution $\mathcal{F}_w^N$ of a parameter $F_w^N(x,y)$ of rank w in the plane of the sample, resulting from the last iteration n=N of steps 120 to 160. In the example considered, the two distributions $\mathcal{F}_1^N$ and $\mathcal{F}_2^N$ of the parameters $\mathcal{F}_1^N(x,y)$ and $F_2^N(x,y)$ resulting from the last iteration N of steps 120 to 160 are used as input layers.

Between the input layers IN and the output layer OUT, the neural network comprises 20 convolution layers $L_1, \ldots L_{20}$, the ranks of which are between 1 (layer adjacent to the layer IN) and 20 (layer adjacent to the layer OUT). Each convolution layer is followed by a normalisation layer (batch normalisation) and a linear rectification layer, usually designated "RELU", making it possible in particular to suppress certain values of the images forming the convolution layer. For example, the negative values may be suppressed by replacing them with the value 0. In a manner which is known in the field of convolutional neural networks, each convolution layer is obtained by applying a convolution kernel to a preceding layer. In this example, the convolution kernel has a size of 5×5. The output layer $OUT=CNN_a(\mathcal{F}_w^N)$ represents at least one spatial distribution $\mathcal{F}_w$ of a parameter $F_w$ in the plane of the sample. $\mathcal{F}_w=CNN_a(\mathcal{F}_w^N)$ may be written in so far as the neural network $CNN_a$ makes it possible to update a spatial distribution $F_w$. In the example represented, the output layer comprises a spatial distribution $\mathcal{F}_1=CNN_a(\mathcal{F}_1^N)$, $F_2=CNN_a(\mathcal{F}_2^N)$ of each parameter considered.

The updating neural network $CNN_a$ has previously been subjected to training by using training images corresponding to known situations, referred to as "ground truth". On the training images, each spatial distribution $\mathcal{F}_{w,gt}$ of each parameter of order w is known, the index gt signifying "ground truth". The training images are subjected to an iterative reconstruction according to steps 120 to 160 so as to obtain reconstructed spatial distributions $\mathcal{F}_w^N$. The training phase allows parameterisation of the neural network, in particular the convolution filters, so that each spatial distribution $CNN_a(\mathcal{F}_w^N)$ is as close as possible to $\mathcal{F}_{w,gt}$. The training step corresponds to step 90 in FIG. 2A.

Following the first iteration of step 170, a set of vectors $\mathcal{F}$ representing the sample is obtained. The set of parameters comprises each spatial distribution $\mathcal{F}_w$ of each parameter $F_w(x,y)$. The method comprises repetition of steps 110 to 160. In the repeated step 110, the set of vectors $\mathcal{F}$ resulting from step 170 is used as a set of initialisation vectors $\mathcal{F}^1$.

The use of the updating neural network $CNN_a$ makes it possible to correct errors of the phase aliasing type occurring during a first implementation of the reconstruction algorithm described in connection with steps 120 to 160. These may in particular be phase aliasing phenomena occurring during the reconstruction.

Following the repetition of steps 110 to 160 initialised using the parameter vectors resulting from step 170, the set of vectors $\mathcal{F}^N$ resulting from the reconstruction is used to form an observation image according to step 180.

Step 180: Formation of an observation image $I_{10}$.

Following the second series of repetitions of steps 110 to 160, vectors F(x,y) which are considered to form a good description of the sample are available. Each vector F(x,y) comprises a term L(x,y) representing an optical path difference experienced by the exposure light wave 14 in relation to a reference exposure light wave in the absence of a cell at the coordinate (x,y). The observation image $I_{10}$ corresponds to a spatial distribution of the quantity L(x,y) in the plane $P_{10}$ of the sample.

FIGS. 3A, 3B, 3C, 3D, 3E, 3F, 3G, 3H and 3I illustrate the steps described above. These figures respectively represent:
- a spatial distribution of a "ground truth" optical path difference $L_{gt}(x,y)$ in a sample plane (units μm);
- a "ground truth" absorbance spatial distribution $\alpha_{gt}(x,y)$ in the plane of the sample;
- a simulation of an image (hologram) acquired by the image sensor, corresponding to a sample whose optical properties correspond to the spatial distributions represented in FIGS. 3A and 3B. The sample/image sensor distance is 1270 μm.
- a spatial distribution of the optical path difference $L^N(x,y)$ in the plane of the sample (units μm), obtained after a first implementation of the iterative algorithm described in connection with steps 120 to 160;
- an absorbance spatial distribution $\alpha^N(x,y)$ in the plane of the sample (units μm), obtained after a first implementation of the iterative algorithm described in connection with steps 120 to 160;
- a spatial distribution of the optical path difference L(x,y) resulting from a first implementation of step 170, the updating neural network being supplied with the spatial distributions represented in FIGS. 3D and 3E;
- an absorbance spatial distribution a(x,y) resulting from a first implementation of step 170, the updating neural network being supplied with the spatial distributions represented in FIGS. 3D and 3E;
- a spatial distribution of the optical path difference L(x,y) resulting from second iterations of steps 120 to 160;
- an absorbance spatial distribution α(x,y) resulting from second iterations of steps 120 to 160.

Steps 100 to 180 are carried out again at various successive instants t so as to obtain a plurality of observation images of the sample $I_{10}(t)$, respectively corresponding to each instant. Thus, starting from an initial instant $t_i$, K observation images $I_{10}(t_i)$, $I_{10}(t_i+1)$ ... $I_{10}(t_i+K)$ are formed. For example, K=5. The instants $t_i$ ... $t_i+K$ form an acquisition time range.

On the basis of the observation images, a second processing phase aiming to detect or predict an occurrence of the cell event is carried out.

Steps 200 to 230, described below, aim to detect an occurrence of a cell event. They are based on employing an artificial intelligence algorithm with supervised training. In this example, it is a detection convolutional neural network $CNN_d$.

Step 200: Formation of input data

During this step, a plurality of images $I_{10}(t)$ acquired between predetermined time intervals, for example 10 minutes, become available.

Step 210: Use of the K observation images $I_{10}(t)$ as input data of a convolutional neural network $CNN_d$, referred to as a detection convolutional neural network.

The detection convolutional neural network $CNN_d$ has previously been subjected to supervised training so as to be able to detect an occurrence of a cell event on the basis of the images forming the input data.

Such a convolutional neural network is represented in FIG. 4. It comprises an input layer $I_{in}$ formed by the K observation images $I_{10}(t)$, and an output image $I_{out}$. The output image $I_{out}$ is an image, with the same dimension as each observation image, showing a position of each cell event possibly detected between the instants $t_i$ and $t_i+K$.

The detection convolutional neural network $CNN_d$ comprises a block for extracting characteristics of the input images. In a manner which is known in the field of convolutional neural networks, the characteristic extraction block comprises a series of layers, each layer resulting from the application of a convolution kernel to a preceding layer. In this example, the convolutional neural network comprises 20 convolution layers $L_1$ ... $L_J$, each layer resulting from the application of a convolution kernel with a size of 3×3 to a preceding layer. The number of convolution filters per layer is equal to 32. The parameters of the convolution filters applied to each layer are determined during the training.

Between two successive layers, each layer undergoes batch normalisation and a linear rectification operation, usually designated "ReLU" (Rectified Linear Unit).

The last convolution layer $L_J$ forms a first layer of a reconstruction block aiming to construct an output image representing a spatial distribution of a probability of occurrence of a cell division. In this application, the reconstruction aims to determine a probability of occurrence of a cell event in each pixel of an image forming the input layer. The output image $I_{out}$ has the same dimension as each observation image forming the input layer, and its grey level corresponds to a probability of occurrence of the cell event considered during the acquisition time range.

The detection convolutional neural network $CNN_d$ makes it possible to use images of any dimension in the capacity of input data. It was programmed with the "deep learning library" module of the Matlab software (developer The Mathworks).

The detection convolutional neural network $CNN_d$ has as previously been subjected to training with the aid of training images. The training is described below in connection with step 200'.

Step 220: On the basis of the image $I_{out}$ forming the output of the detection convolutional neural network $CNN_d$, determination of the occurrence of the cell event and, if applicable, location of a region of interest ROI of the sample in which it is estimated that the cell event took place. When the grey level of the output image $I_{out}$ is commensurately higher than the probability of occurrence of a cell event, the output image comprises bright spots, each bright spot corresponding to a region of interest ROI in which it is estimated that cell division has taken place.

In order to improve the detection performance of the neural network, the observation images forming the input data may be subjected to intensity thresholding so as to eliminate the pixels whose intensity is below a predetermined threshold. The same is true for the output image: output image thresholding makes it possible to address events whose occurrence probability is higher than a predetermined threshold.

Step 230: During this step, each region of interest ROI revealed by the output image $I_{out}$ may be subjected to more precise observation according to the fluorescence imaging mode with high magnification, with the aid of the optical system 25 coupled to the second image sensor 26. In this mode, the sample is illuminated in the excitation spectral band of the fluorescent marker by the second light source 21.

The control unit 40 may be configured to move the sample automatically relative to the optical system 25 so that each region of interest ROI is successively in the object plane of the optical system 25. Step 230 is optional.

Step 200': Training.

Employing a neural network presupposes a training phase. During the training phase, training images corresponding to observation images of a training sample are used, of which it is known whether they correspond to an occurrence of a cell event. Positive training images corresponding to a cell event and negative training images not representative of a cell event are used.

The Inventors carried out training of a detection convolutional neural network as described in step 210. FIG. 5A represents 5 observation images, with a dimension of 121*121 pixels, used as positive training images. In the example represented in FIG. 5A, the cell event is cell division (mitosis). These are images formed by using a sample comprising HeLa cells dividing by mitosis. The observation images are spaced apart by 10 minutes from one another. The images were formed while being temporally centred on either side of the cell division. Thus, if the mitosis takes place at an instant $t_m$, the observation images are obtained on the basis of images respectively acquired at $t_m$−20 minutes, $t_m$−10 minutes, $t_m$, $t_m$+10 minutes, $t_m$+20 minutes. More generally, it is necessary that the observation images used for the training be representative of the occurrence of a mitosis, the latter preferably being centred on the image.

FIG. 5B represents an output training image on which the occurrence of the mitosis is represented by a bright spot at the centre of the image.

The detection convolutional neural network was trained by using datasets comprising:
5 input training images as represented in FIG. 5A;
1 output training image as represented in FIG. 5B.

The images represented in FIGS. 5A and 5B constitute a positive training dataset in so far as it corresponds to an actual occurrence of a mitosis. The positive training datasets were formed by obtaining observation images on the basis of various acquired images, as described in connection with steps 100 to 160. A cell tracking algorithm is applied to the various observation images formed based on the acquired images. The occurrence of a mitosis was detected by an increase in the volume of the cell followed by doubling of the trace of the cell on the observation image, after which two traces remaining in proximity to one another, typically for at least one or two hours, are observed.

The training datasets were supplemented with "negative" datasets on which no mitosis was detected.

More than 10000 training datasets were used.

The acquisition parameters of the training images were:
distance of light source 11—sample: 50 mm;
distance of sample—image sensor 16: 1270 μm;
wavelength of the incident light wave 12: 450 nm;
diameter of the aperture 18 of the light source: 50 μm;
number of pixels of the image sensor: 3200×2700
width of the pixels of the sensor: 1.67 μm.

Experimental Trial of the Detection Convolutional Neural Network

Following the training, the Inventors carried out steps 100 to 240 on test images for which the occurrence and the position of a possible mitosis were known. The test images had not been used during the training phase. Their dimension was 121 pixels×121 pixels. The test images were taken from two different samples comprising cells of the HeLa type.

Table 1 summarises the results obtained:

TABLE 1

|  | Sample reference | |
| --- | --- | --- |
|  | 1 | 2 |
| Number of mitoses | >100 | 77 |
| True positives | 99.05% | 96% |
| False negatives | 0.07% | 1.3% |
| False positives | 0.25% | 1.3% |

According to a second embodiment, the neural network aims not to detect the occurrence of a cell event during the acquisition time range but to predict the occurrence of the cell event at an instant subsequent to the acquisition time range. As described in connection with steps 200 to 220, it is a convolutional neural network.

Step 300: Formation of input data

During this step, a plurality of images $I_{10}(t)$ acquired between time intervals of 10 minutes become available. Thus, starting from an initial instant $t_i$, K observation images $I_{10}(t_i), I_{10}(t_i+1) \ldots I_{10}(t_i+K)$ are formed. For example, K=5.

Step 310: Use of the K observation images $I_{10}(t)$ as input data of a convolutional neural network $CNN_p$, referred to as a prediction convolutional neural network.

The prediction convolutional neural network $CNN_p$ has previously been subjected to supervised training so as to be able to predict an occurrence of a cell event on the basis of the input images, the cell event occurring subsequent to the acquisition of the input images. The structure of the prediction convolutional neural network is similar to that of the detection neural network described in connection with FIG. 4.

In this application, the neural network leads to an output image $I_{out}$ with the same dimension as each observation image forming the input layer, and its grey level corresponds to a probability of occurrence of a cell event subsequent to the acquisition time range, that is to say subsequent to the instants $t_i$ and $t_i+K$.

In contrast to the detection neural network $CNN_d$, the prediction neural network $CNN_p$ makes it possible to predict the occurrence of a cell event in a prediction time interval subsequent to the acquisition time range [$t_i$; $t_i+K$] during which the images of the sample are acquired. This involves detecting a cell event not during the acquisition time range of the images, but subsequent to the latter, for example between 10 minutes and 1 hour after the acquisition time range. Thus, the cell event occurs in a prediction time interval subsequent to the acquisition time range, for example temporally offset from the latter by from 10 minutes to 1 hour The prediction convolutional neural network $CNN_p$ has previously been subjected to supervised training with the aid of training images. The training is described below in connection with step 300'.

Step 320: On the basis of the image forming the output of the prediction convolutional neural network $CNN_p$, prediction of an occurrence of a cell event subsequent to the acquisition time range and location of the possible cell event. The grey level of the output image $I_{out}$ increases as the probability of occurrence of a cell division increases. In this case the output image comprises bright spots, each bright spot corresponding to a region of interest ROI in which it is estimated that cell division will take place in the prediction time interval defined during the training. An example of an output image is described in connection with FIG. 5F.

In order to improve the prediction performance of the neural network, the images forming the input data may be subjected to intensity thresholding. The same is true for the output image. Output image thresholding makes it possible to address events whose occurrence probability is higher than a predetermined threshold.

Step 330: During this step, each region of interest revealed by the output image $I_{out}$ may be subjected to more precise observation according to the imaging mode with high magnification, with the aid of the optical system 25 and the second image sensor 26. This may, for example, involve a fluorescence image. In this mode, the sample is illuminated in the excitation spectral band of the fluorescent marker by the second light source 21. The control unit 40 may be configured to move the sample automatically relative to the optical system 25 so that each region of interest ROI is successively in the object plane of the optical system 25. Step 330 is optional.

Step 300': Training.

Employing a neural network presupposes a training phase. During the training phase, training images corresponding to observation images of a training sample are used, of which it is known whether they correspond to an occurrence of a cell event in a time interval subsequent to the acquisition time range of the images.

The Inventors carried out training of a prediction convolutional neural network as described in step 310. The cell event in question was a mitosis. FIG. 5C represents 5 observation images with a dimension of 121*121 pixels. These are images formed by using a sample comprising cells of the HeLa type. The images were spaced apart by 10 minutes from one another. First, positive training images which precede a mitosis were used. Thus, if the mitosis takes place at an instant $t_m$, the observation images are obtained:
  either on the basis of images respectively acquired at $t_m$—100 minutes, $t_m$—90 minutes, $t_m$—80 minutes, $t_m$—70 minutes, $t_m$—60 minutes (which is represented in FIG. 5C)
  or on the basis of images respectively acquired at $t_m$—70 minutes, $t_m$—60 minutes, $t_m$—50 minutes, $t_m$—40 minutes, $t_m$—30 minutes.

FIG. 5D represents an output training image on which the occurrence of the mitosis is represented by a bright spot at the centre of the image. FIG. 5D was established on the basis of the images represented in FIG. 5E, which corresponds to observation images established before (left image) and after (right image) the mitosis. These images make it possible to identify the location and the instant $t_m$ of the mitosis.

The prediction convolutional neural network was trained by using datasets comprising:
  5 input training images as represented in FIG. 5C;
  1 output training image as represented in FIG. 5D.

The images represented in FIGS. 5C and 5D constitute a positive training dataset in so far as it corresponds to an actual occurrence of a mitosis tens of minutes after the acquisition time range of the images. The training datasets were supplemented with "negative" datasets on which no mitosis was detected following the acquisition time range.

The mitosis detection network was used on cells of the "mouse lung fibroblast" type. This made it possible to detect the occurrence of mitoses in a sample. The device made it possible to identify, in the sample, regions of interest in which a mitosis occurred. It was possible to visualise the mitosis by fluorescence microscopy. FIG. 7 represents a sequence of images of a mitosis which were acquired by fluorescence microscopy. This type of image allows more detailed observation of the mitosis.

It should be noted that when it is used without being coupled with a fluorescence microscopy imaging mode, the method makes it possible to detect cell division without marking.

Experimental Trial of the Prediction Convolutional Neural Network

Following the training of the prediction neural network, the Inventors carried out the above-described steps 100 to 170 and 300 to 320 on test images for which the occurrence and the position of a possible mitosis were known. The test images were not used during the training phase. Their dimension was 121 pixels×121 pixels. The test images were taken from a sample comprising cells of the HeLa type.

During a first series of trials, use was made of a prediction neural network the training of which had been carried out by considering images acquired respectively 100, 90, 80, 70 and 60 minutes before the mitosis. During a second series of trials, use was made of a prediction neural network the training of which had been carried out by considering images acquired respectively 70, 60, 50, 40 and 30 minutes before the mitosis.

Table 2 summarises the results obtained:

TABLE 2

| | Trial series reference | |
| --- | --- | --- |
| | 1 | 2 |
| Number of mitoses | 65 | 52 |
| True positives | 74% | 79% |
| False negatives | 12% | 6% |
| False positives | 12% | 12% |

Although performing less well than the detection neural network, as was expected, the prediction neural network makes it possible to obtain usable results, the incidence of true positives being more than 70%.

FIG. 5F represents an output image of the cell division prediction neural network. In this image, each bright point corresponds to a probability of occurrence of a cell division, the probability being higher than a predetermined threshold, in the prediction time interval defined during the training step.

In the examples described in connection with FIGS. 5A to 5F, the cell event is a cell division. The invention may also apply to the occurrence of a cell death. A cell death may be accompanied by a change in the shape of a cell, the latter becoming rounded. This particular feature may be used to detect the occurrence of a cell death.

A detection convolutional neural network $CNN_d$ has a structure which is similar to that described in connection with steps 200 to 220, as well as FIG. 4. It has been parameterised to detect the occurrence of a cell death.

FIGS. 6A and 6C respectively represent 5 observation images with a dimension of 121*121 pixels. These are images formed by using a sample comprising cells of the HeLa type. The observation images were spaced apart by 10 minutes from one another. The images were formed while being temporally centred on either side of the cell death. Thus, if the cell death takes place at an instant $t_a$, the observation images are obtained on the basis of images respectively acquired at $t_a$−20 minutes, $t_a$−10 minutes, $t_a$, $t_a$+10 minutes, $t_a$+20 minutes.

FIGS. 6B and 6D represent an output training image on which the occurrence of the cell death is represented by a bright spot at the centre of the image. FIGS. 6B and 6D respectively correspond to the image series which are represented in FIGS. 6A and 6C.

The cell death detection convolutional neural network was trained by using datasets comprising:
  5 input training images as represented in FIG. 6A or 6C;
  1 output training image as represented in FIG. 6B or 6D.

Variants

The description above has described how to obtain an observation image of the sample, corresponding to a spatial distribution of an optical path difference L(x,y), by adopting a method described in U.S. Pat. No. 16,907,407.

Other ways of obtaining a spatial distribution of an optical path difference or of absorbance may also be used. For example, the optical path difference and the absorbance may be obtained as described in Application US20200124586.

Methods making it possible to estimate a refractive index $n_p$ of each cell may also be used as a basis. More precisely, it is possible to estimate an average optical path difference L(x,y) induced by the cell on the basis of a difference between the index $n_p$ of a cell and the refractive index of the medium. The refractive index of the cell may be estimated as described in Patent Application WO2020128282 or US20200110017.

On the basis of the refractive index of the cell, by means of taking into account a thickness of the cell, the optical path difference may be estimated according to expression (1).

According to another possibility, each observation image of the sample corresponds to a spatial distribution of an absorbance α(x,y) of the sample.

It should be noted that the method described in connection with FIG. 2A makes it possible to detect and locate a cell division, or a cell death, without necessarily employing a fluorescent marker or a coloured marker. This method can be carried out without marking. Marking may facilitate the observation of each cell division detected according to the second mode.

According to one embodiment, in the first mode, image forming optics are arranged between the sample and the image sensor. The device then comprises an optical system 19 defining an object plane $P_{obj}$ and an image plane $P_{im}$, as represented in FIG. 8. The first image sensor 16 is then arranged in a so-called defocused configuration, according to which the sample extends in a plane offset relative to the object plane and/or the detection plane of the first image sensor extends in a plane which is offset relative to the image plane. A defocused configuration is intended to mean a configuration having an offset of the sample and/or the first image sensor relative to a focused configuration, according to which the detection plane $P_0$ is conjugate with a plane $P_{10}$ in which the sample extends. The offset δ is preferably less than 500 μm, or even less than 200 μm. It is preferably more than 10 μm or 20 μm. In the same way as in a lensless configuration, such a configuration makes it possible to obtain an image in which each cell appears in the form of a diffraction pattern, interference being produced between the light wave emitted by the first light source and propagating as far as the first image sensor and the diffraction wave generated by each particle of the sample.

In the example represented in FIG. 8, the object plane $P_{obj}$ coincides with a plane $P_{10}$ in which the sample extends and the image plane $P_{im}$ is offset relative to the detection plane $P_0$ by an offset δ.

The method described in connection with steps 100 to 180 may be applied to images acquired according to such a configuration. A lensless imaging configuration is, however, preferred because of the larger observation field that it provides and its greater compactness.

The invention claimed is:

1. A method for detecting or predicting the occurrence of a cell event, selected from between cell division or cell death, in a sample, the sample extending in at least one sample plane and comprising cells immersed in a medium, the method comprising:
  a) arranging the sample between a light source and an image sensor;
  b) illuminating the sample using the light source and acquiring a plurality of successive images of the sample using the image sensor, at different instants forming an acquisition time range, each image being representative of an exposure light wave to which the image sensor is exposed;
  c) on the basis of each acquired image of the sample, calculating an observation image at each instant, the observation image corresponding to a spatial distribution:
    of an optical path difference induced by the cells, the optical path difference at each transverse coordinate corresponding to a difference between the optical path of the exposure light wave respectively in the presence and in the absence of a cell at the said transverse coordinate
    or of an absorbance of the cells, in the sample plane;
  wherein the method further comprises:
  d) using the observation images at each of the different time instants over the acquisition time range resulting from c) as input data of a supervised artificial intelligence algorithm, so as
    to detect and locate an occurrence of the cell event during the acquisition time range;
    or to predict an occurrence and a location of the cell event subsequent to the acquisition time range
  wherein in b)
  no image forming optics are arranged between the sample and the image sensor;
  or
  an optical system is arranged between the sample and the image sensor, the optical system defining an object plane and an image plane, the object plane and/or the image plane being offset relative to the sample and/or to the image sensor respectively;
  and
  wherein in c), for each instant, the observation image is calculated by applying an iterative reconstruction algorithm to the image acquired at said instant.

2. The method according to claim 1, wherein the optical path difference corresponds:
  in the presence of a cell, to a difference between the respective refractive indices of the cell and the medium multiplied by the thickness of the said cell;
  in the absence of a cell, to a value of zero.

3. A method for detecting or predicting the occurrence of a cell event, selected from between cell division or cell death, in a sample, the sample extending in at least one sample plane and comprising cells immersed in a medium, the method comprising:
- a) arranging the sample between a light source and an image sensor;
- b) illuminating the sample using the light source and acquiring a plurality of successive images of the sample using the image sensor, at different instants forming an acquisition time range, each image being representative of an exposure light wave to which the image sensor is exposed;
- c) on the basis of each acquired image of the sample, calculating an observation image at each instant, the observation image corresponding to a spatial distribution:
  - of an optical path difference induced by the cells, the optical path difference at each transverse coordinate corresponding to a difference between the optical path of the exposure light wave respectively in the presence and in the absence of a cell at the said transverse coordinate
  - or of an absorbance of the cells, in the sample plane;

wherein the method further comprises:
- d) using the observation images at each of the different time instants over the acquisition time range resulting from c) as input data of a supervised artificial intelligence algorithm, so as
  - to detect and locate an occurrence of the cell event during the acquisition time range;
  - or to predict an occurrence and a location of the cell event subsequent to the acquisition time range wherein in b)
no image forming optics are arranged between the sample and the image sensor;
or
an optical system is arranged between the sample and the image sensor, the optical system defining an object plane and an image plane, the object plane and/or the image plane being offset relative to the sample and/or to the image sensor respectively;
and
wherein in c), for each instant, the observation image is calculated by applying an iterative reconstruction algorithm to the image acquired at said instant,
wherein during c), each observation image is calculated by using an iterative algorithm comprising:
- i) assigning parameters of the sample to different coordinates of the plane of the sample, at least one parameter being the optical path difference or the absorbance;
- ii) calculating a complex image of the sample as a function of the parameters of the sample, the complex image of the sample being defined in the plane of the sample;
- iii) propagating the complex image of the sample resulting from ii) so as to estimate an image acquired by the image sensor;
- iv) comparing the image estimated during iii) with an image acquired by the image sensor at the same instant;
- v) refreshing the parameters of the sample as a function of the comparison;
- vi) repeating ii) to v) while refreshing the complex image of the sample at each iteration with the aid of the parameters refreshed during v) of the preceding iteration, ii) to v) being repeated for a number of predetermined iterations or until reaching a criterion for ending the iterations.

4. The method according to claim 3, wherein the method comprises,
- vii) using the parameters of the sample, which result from vi), as input data of an updating neural network for updating the parameters of the sample;
- viii) then repeating i) to vi) while using the parameters resulting from vii) in i).

5. The method according to claim 1, wherein c) comprises:
estimating a refractive index of cells;
taking into account a thickness of each cell along the propagation axis;
at each transverse coordinate corresponding to a cell, determining the optical path difference on the basis of the refractive index and the thickness of the cell.

6. The method according to claim 1, wherein the supervised artificial intelligence algorithm uses a convolutional neural network, the observation images being used as an input layer of the convolutional neural network.

7. The method according to claim 1, wherein d) comprises detection and location of an occurrence of the cell event during the acquisition time range.

8. The method according to claim 1, wherein d) comprises detection and location of an occurrence of the cell event during a temporal prediction interval subsequent to the acquisition time range.

9. The method according to claim 8, wherein the temporal prediction interval may occur between 10 minutes and 1 hour after the acquisition time range.

10. The method according to claim 1, wherein the image sensor used during b) is a first image sensor, the method comprising, following d),
- e) determining a region of interest, containing the cell division, of the sample;
- f) positioning the sample in the object plane of an optical system, the optical system defining a magnification greater than 1, the optical system being coupled to a second image sensor;
- g) acquiring an image of the region of interest of the sample using the second image sensor.

11. The method according to claim 1, wherein the sample comprises a fluorescent marker, the fluorescent marker defining an excitation spectral band and a fluorescence spectral band, the method being such that during g):
the sample is illuminated using a second light source, which is configured to illuminate the sample according to the excitation spectral band;
the image of the region of interest of the sample is acquired in the fluorescence spectral band.

12. A device for observing a sample, comprising:
a light source;
an image sensor;
a support configured to hold the sample between the light source and the image sensor;
a processing unit configured to carry out steps c) and d) of the method according to claim 1 on the basis of images acquired by the image sensor.

* * * * *